United States Patent [19]

Yamamoto

[11] Patent Number: 4,484,540
[45] Date of Patent: Nov. 27, 1984

[54] COLLAPSIBLE, PORTABLE DOMESTIC PET CAGE

[76] Inventor: Yoshikazu Yamamoto, 1-1, 3-chome, Eganosho, Habikino, Osaka, Japan

[21] Appl. No.: 575,991

[22] Filed: Feb. 1, 1984

[30] Foreign Application Priority Data

Mar. 24, 1983 [JP] Japan .................................. 58-43116

[51] Int. Cl.³ .............................................. A01K 1/02
[52] U.S. Cl. ..................................................... 119/19
[58] Field of Search .................... 119/19, 17; 220/6, 7, 220/4

[56] References Cited

U.S. PATENT DOCUMENTS

| 844,955 | 2/1907 | Morgan | 119/19 |
| 3,048,147 | 8/1962 | McKean | 119/19 |
| 3,195,506 | 7/1965 | Beard | 119/19 |
| 3,896,766 | 7/1975 | Martin | 119/19 |
| 4,256,056 | 3/1981 | Sov | 119/19 |
| 4,397,398 | 8/1983 | Watanabe | 119/19 |

FOREIGN PATENT DOCUMENTS

| 730458 | 3/1966 | Canada | 119/17 |
| 975364 | 11/1964 | United Kingdom | 119/19 |
| 2035034 | 6/1980 | United Kingdom | 119/19 |

*Primary Examiner*—Jay N. Eskovitz
*Attorney, Agent, or Firm*—Moonray Kojima

[57] ABSTRACT

This invention is concerned with an improved construction of collapsible, portable domestic pet cage for carrying with a pet keeper such domestic pets as dogs, cats and the like, wherein bent portions of the cage can be readily constructed without using any connecting means and fixing means, and when collapsed dimensionally in a small form, the whole circumferential walls of the cage is accommodated between vertical walls of ceiling plate and erected walls of receptacle plate or dish so as to be made dimensionally in a small size.

6 Claims, 11 Drawing Figures

COLLAPSIBLE, PORTABLE DOMESTIC PET CAGE

DESCRIPTION OF PRIOR ART

Most of the conventional collapsible, portable cages for carrying with a pet keeper his domestic pets are composed generally of a casing having each of circumferential walls which is provided inwardly of a cage in collapsible relation thereby to make it possible to fold or collapse each wall in the least bulky sizes.

The disadvantages with these existing cages are, however, that they need hinges or other similar connecting or fixture metal means, consequently giving rise to unexpectedly higher cost of manufacture due to the necessity of the above-mentioned means. Further according to the conventional types, metallic buckles are mounted both on a ceiling plate and a receptacle plate in order to keep the case folded. However, when the case is raised to put domestic pets in for carriage purpose, trap loops of the buckles are suspended to present a poor outer appearance and in order to roll a cage cover on the outer surface of the case, a band or any other means for fixing the cover is additionally necessary.

OBJECTS OF THE INVENTION

Accordingly, the present invention has been devised to eliminate all the above-mentioned drawbacks and disadvantages of the conventional type, having for one of its main objects a provision of an improved type collapsible, portable domestic pet cage wherein the whole circumferential walls of the cage can be folded inwardly thereof without using such fixture means as a connecting metal means and a buckle.

Another object of the invention is to provide a collapsible, portable domestic pet cage wherein long sided walls are fixedly mounted to a ceiling plate and a receptacle plate in engaged relation with each other thereby making it unnecessary to use any fixture means, wherein each of said long sided walls is provided latitudinally and intermediately thereof with a thin folding portion which divides the wall into an upper edge portion and a lower edge portion so that said thin folding portion functions in the form of hinges, the result being that hinges or other similar connecting means are not necessary.

Another object of the invention is to provide a collapsible, portable domestic pet cage wherein short-sided walls have their lowermost ends that pivotally support the receptacle plate in a manner to selectively erect and incline while the uppermost ends are mounted in the engageable relation with the ceiling plate to form an engageable portion that serves as fixture means so that the cage can be rigidly fixed in detouchable relation without using particular fixture means such as a buckle.

Another object of the invention is to provide a collapsible, portable domestic pet cage that is composed of a ceiling plate and a receptacle plate which are both made of synthetic resin material and have their sides opposite to each other, wherein an engageable means is protruded in integral relation thereby to make it unnecessary not only to use a particular fixture means such as metallic buckles and the like, but also to manually engage the ceiling plate and the receptacle since they are engageable merely by forcing the ceiling plate down in a folded state. Furthermore inasmuch as an engageable means of the receptacle plate serves as a mounting means of a cover for covering the cage, there is no need of a band for fastening the outer peripheral portions of a covering, resulting in mounting operation being easily carried out.

A further object of the invention is to provide a collapsible, portable domestic pet cage wherein at least one of said short sided walls has its outer surface pivotally supported in one end thereof so as to form a pocket cover that can be selectively opened and closed thereby providing a pocket for receiving therein pet baits and the like.

A still object of the invention is to provide a collapsible, portable domestic pet cage wherein said short sided walls have one of their lower pivoting portions disposed so as to stand on a level different from the other by width of said side wall whereby said short sided walls can be folded horizontally into the receptacle plate. This has a result that the whole circumferential walls can be compactly accommodated within the ceiling plate, the suspended wall of the receptacle plat and the erected wall thereof with the least resistance.

DETAILED DESCRIPTION OF THE INVENTION

Setting forth now in detail a few preferred embodiments of the present invention in conjunction with the accompanying drawings wherein numeral 1 generally designates a collapsible, portable domestic pet cage constructed into a book case shape which comprises a ceiling plate 2 provided with a handle 3 in the upper intermediate portion thereof, a pair of long sided walls 4 and 5 that are formed into a mesh netting shape, a pair of short sided walls 6 and 7 that are formed into opposition to each other and can be selectively erected or inclined, as desired, and a receptacle plate 8 that supports the lower ends of said short sided walls 6 and 7.

Figure 3:
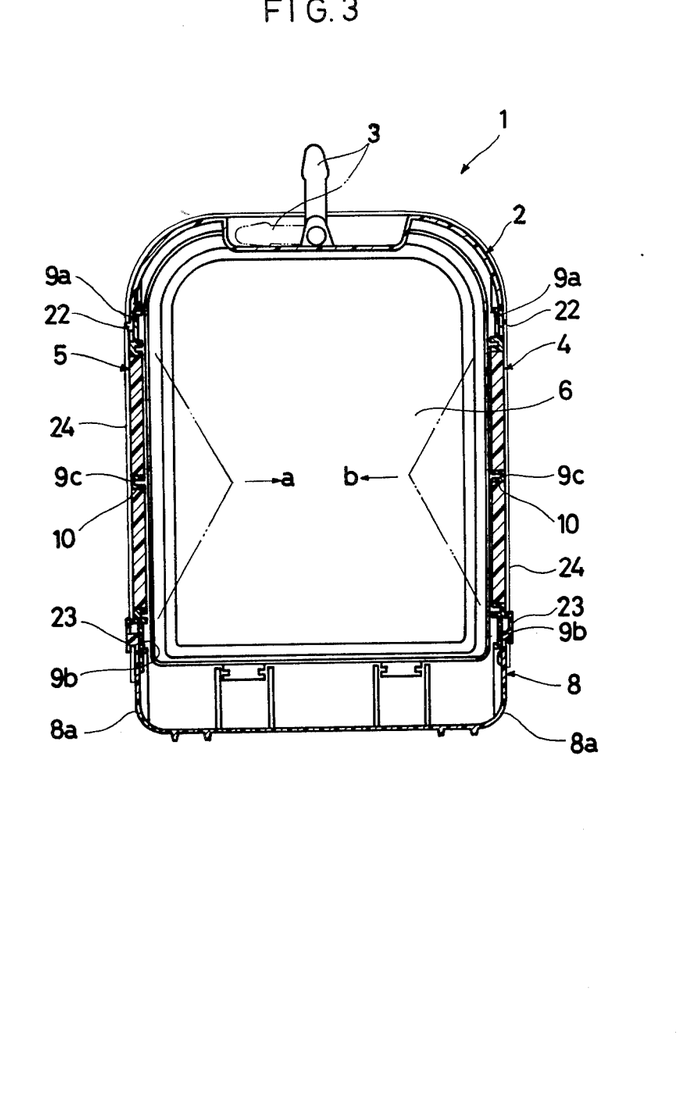
FIG. 3 is a vertical cross-sectioned elevation taken on the Line A—A of FIG. 2.

As is definitely shown in FIG. 3, each of said long sided walls 4 and 5 has a thin latitudinal folding line in the upper portion 9a, in the lower portion 9b and in the intermediate portion 9c, respectively, thereof in a manner that said each of short sided walls 4 and 5 is folded intermediate thereof by pressing said intermediate folding line 9c from the outside into the directions shown by the arrows a and b through said folding lines 9a and 9b. Said intermediate folding line 9c is reinforced with thick wall portions formed along the thin edge portion 10 of the line 9c so that the latter line 9c is normally held in an easily foldable or collapsible state.

Figure 4:
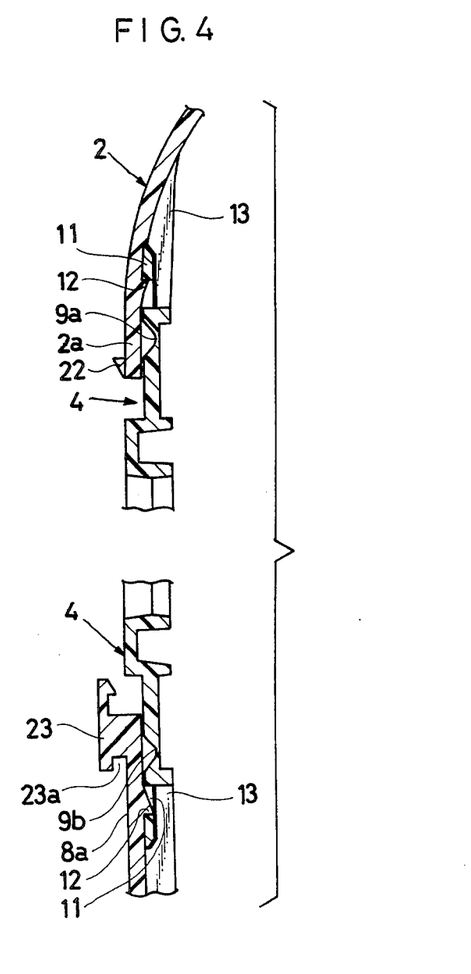
FIG. 4 is a partially cutaway vertical cross-sectioned elevation showing as to how the suspended ceiling plate in one of the long sided walls is engaged with the erected wall of the receptacle plate.

Further as shown in FIGS. 3 and 4, each of said long sided walls 4 and 5 has an upper edge which is adapted to be fixedly engageable with said ceiling plate 2 and is provided with a plurality of engaging holes 11 at suitably spaced apart intervals while projections 12 are protruded from the suspended wall 2a of the ceiling plate 2 in correspondence to the positions and number of said engaging holes 11 so as to permit each of said upper edge of the long sided walls 4 and 5 to be insertible into each space between holding pieces 13 which is adapted to prevent said said long sided walls 4 and 5 from coming off thereby said projections 12 can be inserted into the engaging holes 11 to fix the long sided walls 4 and 5 to the ceiling plate 2 in integral relation on one another.

Likewise, said long sided walls 4 and 5 have their lower edges provided with a plurality of engaging holes 11 whilst the erected wall 8a of said receptacle plate 8 is internally provided with projections 12 in correspondence to the positions and number of said engaging holes 11.

Said lower edges are each inserted between the holding pieces 13 while said projections 12 are engaged with said engaging holes 11 thereby mounting said upper edges to the receptacle plate 8 in fixed relation.

Figure 5:
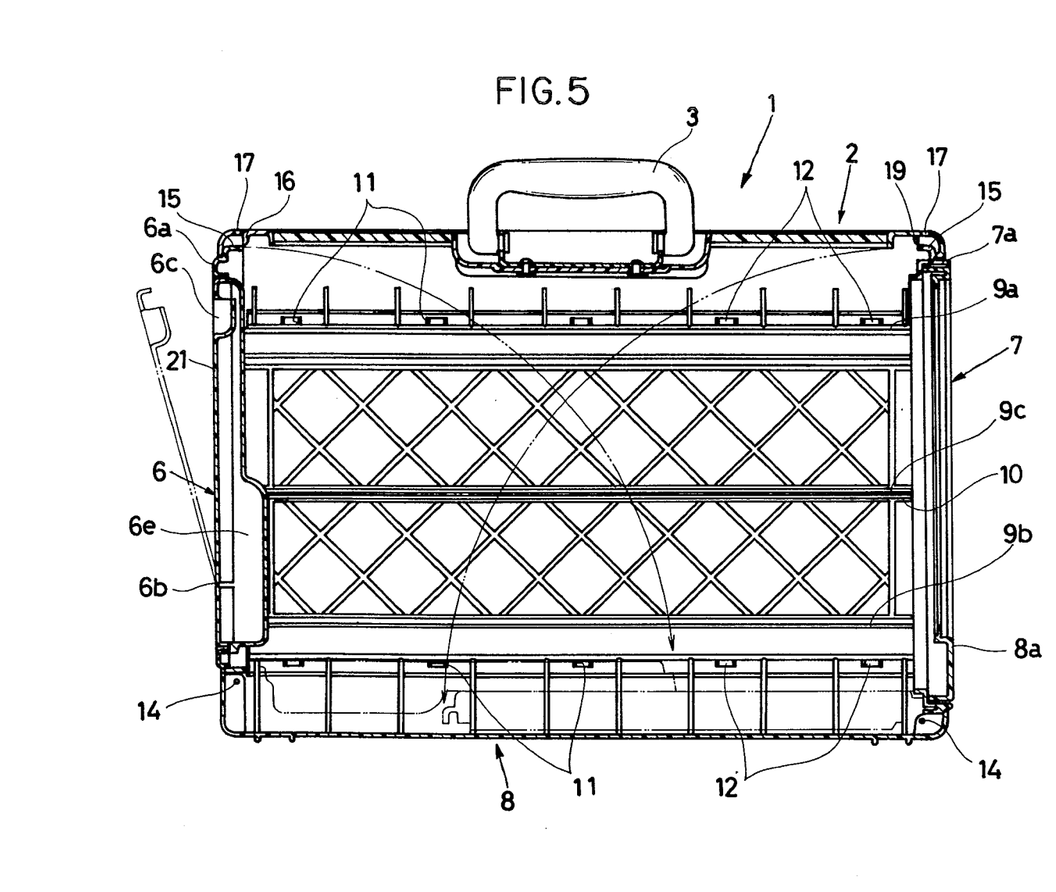
FIG. 5 is a vertical cross-sectioned elevation taken on the Line B—B of FIG. 2.

In the meantime, said short sided walls 6 and 7 have their lowermost ends pivotally supported to the receptacle plate in internally inclined relation, the pivotal position thereof being such that the short sided wall 6 of said two walls is disposed at a higher level than the other wall 7 by the width of the latter, as is clearly shown in FIG. 5, so that both said two short sided walls 6 and 7 are folded to overlap with one another within the receptacle plate 8 in horizontal relation.

Figure 6:
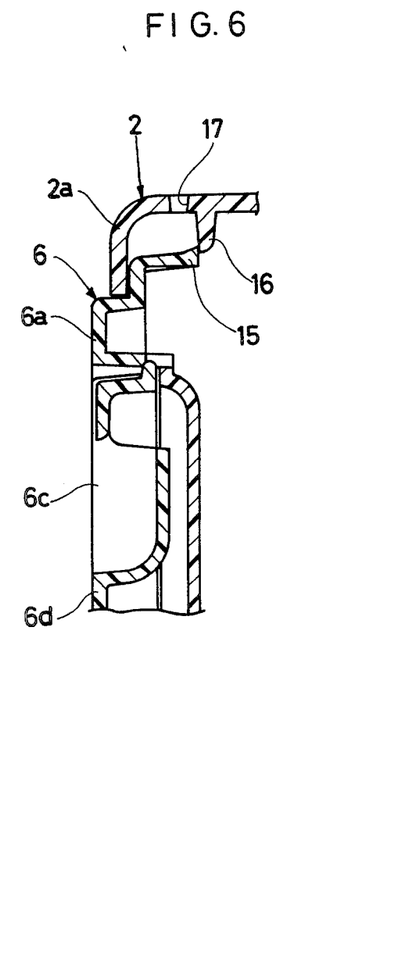
FIG. 6 is an enlarged vertical cross-sectional elevation of FIG. 5 showing an intermediate portion of one of the short sided walls.

In the upper intermediate portion of said short sided walls 6 and 7 mounted to the ceiling plate 2 in detouchable relation there is integrally provided substantially L shape engaging projection pieces 15, respectively, as shown in FIGS. 5 and 6 of the accompanying drawings in a manner that each extremity of said engaging pieces 15, once pressed against the suspended pieces 16 of said ceiling plate 2, is forced to turn upwardly to its original position thereby being held in an erected state so that said engaging pieces 15 are limited to move inwardly.

Moreover, said ceiling plate 2 external of said suspended pieces 16 is bored with disengaging holes 17 for disengaging the vertically erected state of said short sided walls 6 and 7, through said holes 17 such a pressing means as a coin or the like so as to be insertible to force down the upper surface of said engaging projection pieces 15 whereby the extremities of the latter pieces 15 are made to come off the suspended pieces 16 to prevent the short sided walls 6 and 7 from freely moving inwardly.

Figure 7:
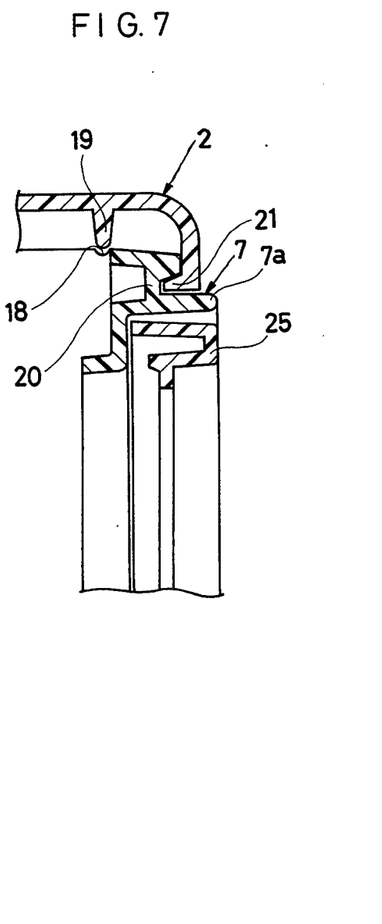
FIG. 7 is an enlarged vertical cross-sectioned elevation showing both upper side surfaces of the short sided walls, that is, taken on the Line C—C of FIG. 2.

As clearly shown in FIG. 7, said short sided walls 6 and 7 have their upper intermediate sides provided with engageable recessed portions 18 while the ceiling plate 2 opposite to one another have suspended engageable pieces 19 with the lowermost ends thereof inserted in said recessed portions 18 so as to hold said short sided walls in erected relation with respect to the ceiling plate 2.

In each portion of the upper sides, and in the upper and lower portions, of the outer circumferential portion of the circumferential frame members 6a and 7a which compose said short sided walls 6 and 7, there are formed engageable recessions 20 while there are formed resilient members 21 projected integrally in each position of the long sided walls 4, 5 corresponding to the lowermost ends of suspended wall 2a of said ceiling plate 2 and engageable recessions 20 so that by inserting said resilient members 21 into said engageable recessions 20, limitation is given to the external movement of said short sided walls 6 and 7 and to unexpected external inflation of said long sided walls 4 and 5.

The outer side surface of said short sided wall 6 has its circumferential frame member 6a which is internally formed with a thin folding line 6b in the lower portion thereof which the upper portion is provided with an opening and closing packet cover 6d having a portion 6c which a user may finger, thus forming an inner portion 6e of the short sided wall 6 for a spatial room which provisionally provides a bait pocket to receive therein a bait for domestic pets.

On the other hand, said short sided wall 7 has its circumferential frame 7a wherein a door is pivotally supported at one side thereof to permit domestic pets to come into and out therethrough, being able to open and close by the action of a lock lever 26.

Said ceiling plate 2 has longitudinal suspended walls 2a from whose lower edges of said erected walls 8a of the receptacle plate 8 in correspondence to said projections 22, a pair of hooks 23 are integrally formed so that when the cage 1 of the present invention is folded, said projections 22 are brought into hooked engagement with said hooks 23 thereby connecting the ceiling plate 2 with the receptacle plate 8.

Figure 1:
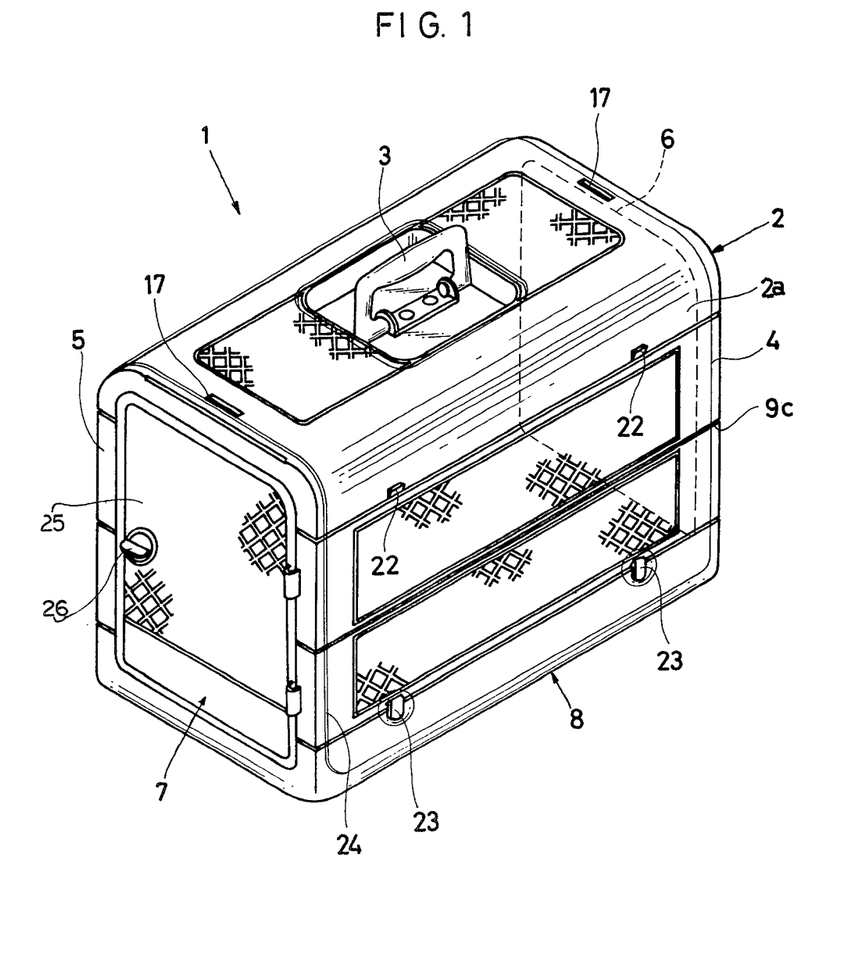
FIG. 1 is a perspective view showing as to how a covering is mounted on the collapsible, portable domestic pet cage of the present invention.
Figure 2:
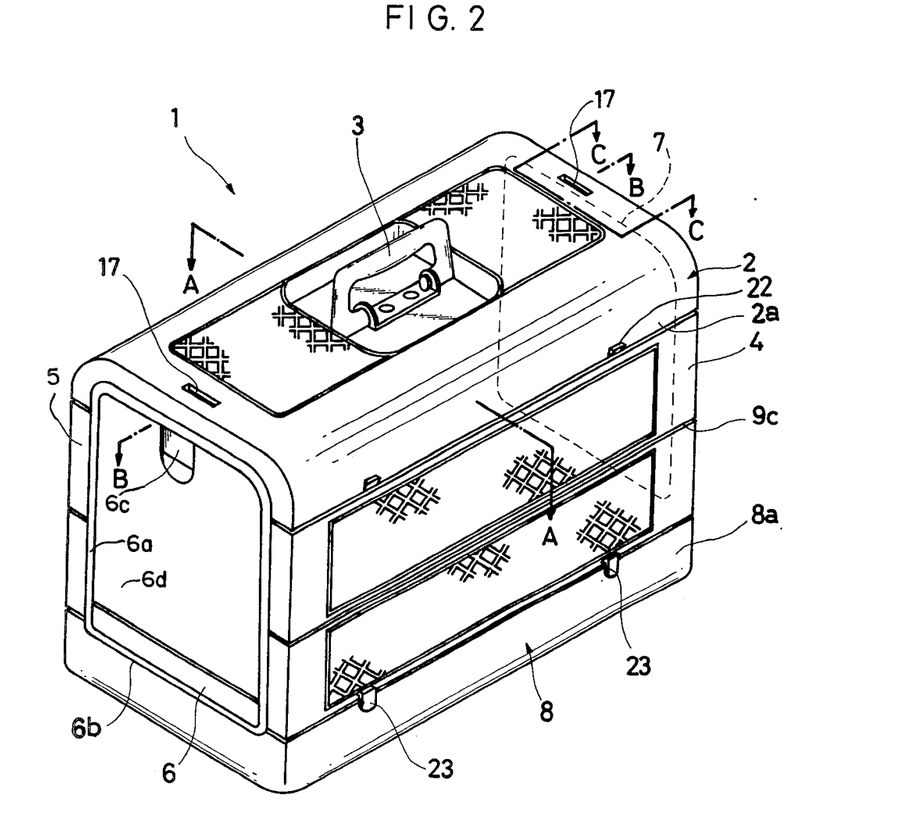
FIG. 2 is a perspective view showing reversely the case of FIG. 1.
Figure 10:
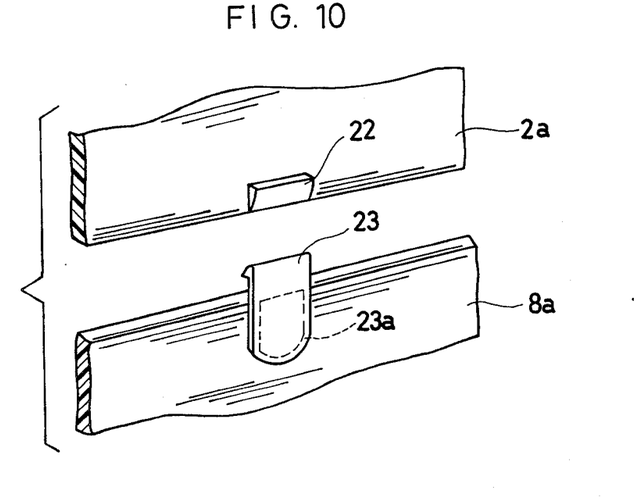
FIG. 10 is an enlarged view showing as to how an engageable means is protruded outwardly from the suspended wall of the ceiling plate and the outer side portion of the receptacle plate.
Figure 11:
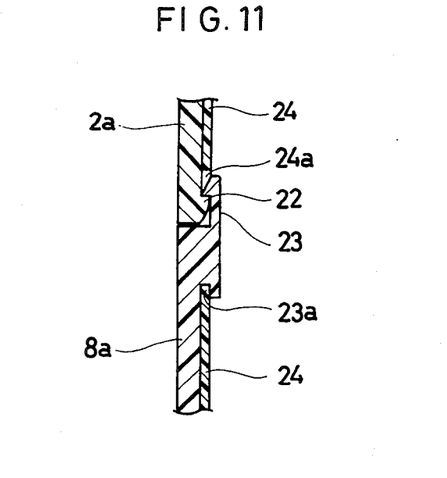
FIG. 11 is a vertical cross-sectioned elevation showing the engaged relation of the engageable means.

As shown in FIGS. 10 and 11, there is formed a recessed groove 23a around the outer peripheral surface of said hook 23 whereby, as shown in FIG. 1 said engageable hole 24a of the cage cover 24 is insertibly engageable with said recessed groove 23a.

Said cage cover 24 is composed of a transparent resin sheet which permits a pet in the cage to be seen therethrough. However, instead of said sheet, any other suitable cloth or similar covering may be employed since said engageable holes 24a are provided at both sides of the cage 1.

In case the cage 1 of the invention which is provided with the cover 24 is folded, said cover 24 is in the first place removed and then the substantially L shape engaging piece 15 of said short sided wall 7 whose lower end is pivotally supported at the side of the door and in the lower position of the receptacle plate 8 is forced down through the disengaging holes 17 by means of a coin or the like, the engaged relation between the suspended pieces 16 and said holes 17 are released whereby the short sided wall 7 beside the door is inwardly inclined with the lower edge pivotal partion as its pivoting point, thus being folded on the bottom of said receptacle plate 8 as is shown by imaginary lines in FIG. 5.

In the second place, the substantially L shape engaging piece 15 of the short sided wall 6 which is provided with said receptacle plate 8 and whose lower end is pivotally supported on a higher level is forced down likewise through the disengaging hole 17 by means of a coin or the like whereby the engaged relation between the suspended pieces 16 and the holes 17 are released to result in said engaging piece 15 being collapsed to fold on the short sided wall 7 which is besides the door 25 in inclined relation.

In the third plate, the long sided walls 4 and 5 can be collapsed into small dimensions by forcing down the intermediate portion of the upper and lower side wall portions simultaneously from both sides thereof in mutually internal directions whereby the long sided walls 4 and 5 are folded intermediate thereof along the intermediate folding line 9c while at the same time the ceiling plate 2 comes down by its own gravity, the result being that the long sided walls 4 and 5 are folded on the short sided walls 6 and 7 that were folded in advance, as shown by imaginary lines of FIG. 3, that is, in the directions of the arrows a and b.

Figure 8:
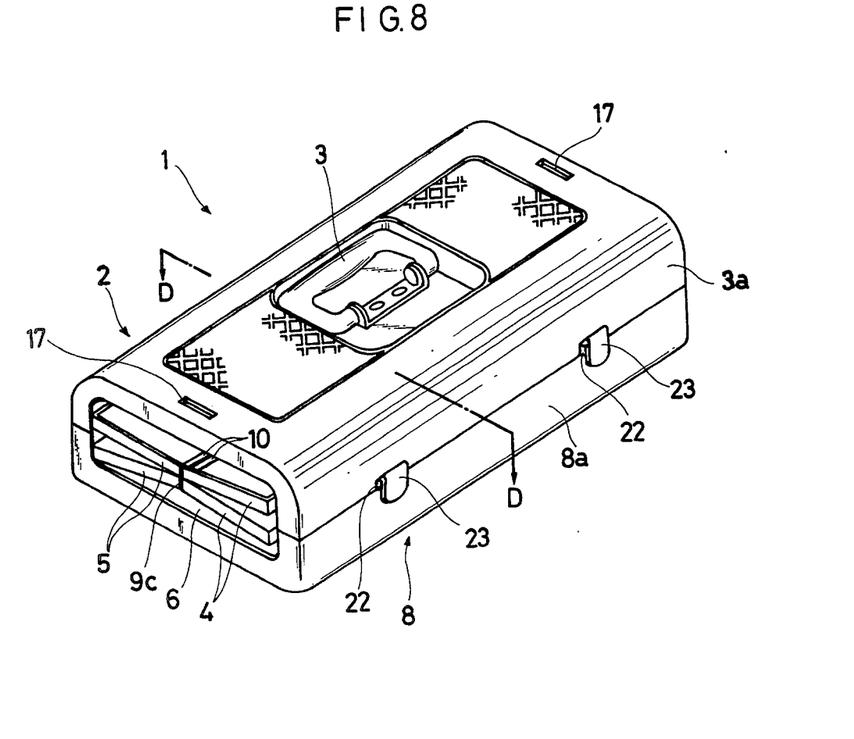
FIG. 8 is a perspective view showing as to how the case of the invention is folded.
Figure 9:
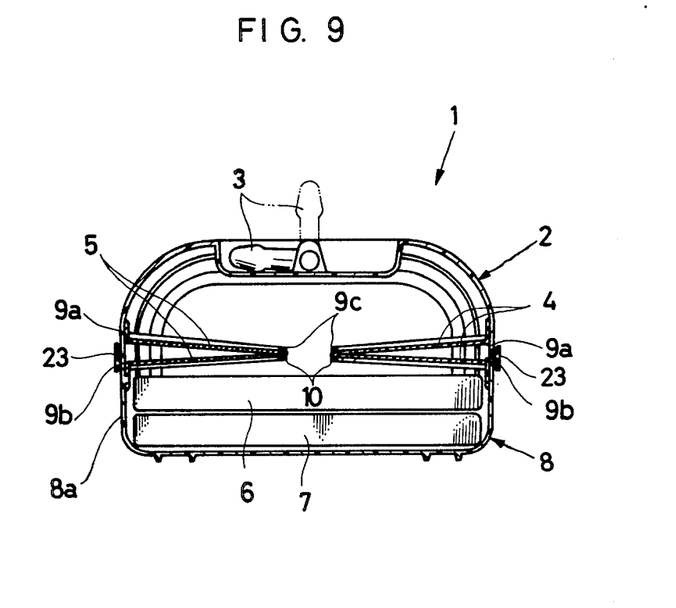
FIG. 9 is a vertical cross-sectioned elevation taken on the Line D—D of FIG. 8.

Thereafter the ceiling plate 2 and the bottom plate are both pressed inwardly whereby said engageable projections 22 of the suspended wall 3a of the ceiling plate 2 is brought into engagement with the hook 23 of the erected wall 8a of the receptacle plate 8 to be connected with one another in integral relation as in the state shown in FIG. 8.

Now referring to the method of constructing the case 1 of the invention, said engageable projections 22 are disengaged from the hook 23 and then a user may raise the cage 1 by grasping the handle 3 whereby in synchronism therewith both the long sided walls 4 and 5 are made erected. Then he may move outwardly the short sided wall 6 which is adjacent to the pocket and folded on said long sided wall so as to erect said wall 6 to engage the upper portion of the latter wall with the ceiling plate 2. Last of all, the short sided wall 7 which is disposed adjacent to the door 25 and folded in the lower position is likewise moved outwardly to fixedly engage the upper portion of the wall 7 with the ceiling plate 2.

It should be noted that the present invention, illustrated and described in detail in the drawings and foregoing description, is to be considered as illustrative and restrictive in character, and that all changes and modifications that come within the spirit of the present invention are included.

What is claimed is:

1. A collapsible animal cage, comprising a top portion having four vertical walls extending downward perpendicularly from a ceiling;

a bottom portion having four vertical walls extending upward perpendicularly from a floor, said vertical walls of said bottom portion and of said top portions being of suitable dimensions and disposed to fit against each other in a collapsed state of said cage, wherein said top vertical walls and said bottom vertical walls have at corresponding edges thereof, locking means, said locking means comprising a recess and a resilient holder means, whereby in said collapsed state said top portion and said bottom portion are locked together by said resilient holder means holding said recess;

two side portions being of suitable dimensions and disposed to fit within said top portion and said bottom portion in said collapsed state, and positioned opposite each other in an erected state of said cage, each of said side portions comprising an upper part and a lower part and a flexible interconnecting part connecting said upper part and said lower part, means for lockedly holding said side portions substantially parallel to said vertical walls of said top portion and said bottom portion in said erect state, said means for lockedly holding comprising for both said top portion and said bottom portion and said upper part of said side portion and said lower part of said side portion, a projection in said vertical wall of said top or bottom portion and corresponding thereto a notched portion in said side portion and resilient means to hold said projection and notch connected together in said erect state, and a holding space in said top portion whereat said upper part of said side portion is disposed in said erect state, whereby to cause a collapsed state of said cage, said interconnecting part of said side wall portion is pushed inward thereby breaking said connection between said notched part and said projection, and thereby enable said upper part and said lower part of said side portions to fit together next to each other within said top portion and said bottom portion;

two end portions being of suitable dimensions and disposed to fit within said top portion and said bottom portion in said collapsed state and disposed opposite to each other and perpendicular to said side portions in said erect state, each of said end portions having a bottom section pivotally connected to said bottom portion whereby said end portion is disposed to lie flat in said bottom portion in said collapsed state and disposed to be perpendicular to said bottom portion in said erect state, one of said end portions being disposed higher than the other end portion so that said one end portion will lie on top of said other end portion in said collapsed state;

lock means comprising a lip of said top portion and a projection from said top portion, said end portion having an upper section, said upper section lockedly fixed between said lip and said projection in said erect state, thereby to hold said end portions in said vertical position in said erect state, and a hole in said top portion for insertion of a force to break said fixed condition of said upper section between said lip and said projection, whereby said upper section is freed from said holding and said end portion is caused to pivot about said pivot point and to thereby lie flat within said bottom portion in said collapsed state of said cage.

2. The cage of claim 1, wherein one of said end portions has a movable door therein for entry and exit of animal.

3. The cage of claim 1, wherein one of said end portions has a closable opening for introduction of food.

4. The cage of claim 1, wherein said top portion has a handle movable to be flat in one condition and vertical in another condition.

5. The cage of claim 1, wherein said side portions and said top portion are of transparent material.

6. The cage of claim 1, wherein said side portions and said end portions are made of resin.

* * * * *